United States Patent
Hansen et al.

(10) Patent No.: US 6,934,524 B2
(45) Date of Patent: Aug. 23, 2005

(54) FINE-STAGE AUTOMATIC FREQUENCY COMPENSATION IN POST-DETECTION SHORT-RANGE WIRELESS APPLICATIONS

(75) Inventors: Eric John Hansen, Lynchburg, VA (US); Wenzhe Luo, Allentown, PA (US); Zhigang Ma, Allentown, PA (US); Richard L. McDowell, Chalfont, PA (US)

(73) Assignee: Agere Systems Inc., Allentown, PA (US)

( * ) Notice: Subject to any disclaimer, the term of this patent is extended or adjusted under 35 U.S.C. 154(b) by 578 days.

(21) Appl. No.: 10/131,214

(22) Filed: Apr. 25, 2002

(65) Prior Publication Data

US 2003/0203729 A1 Oct. 30, 2003

(51) Int. Cl.⁷ .................................................. H04B 1/26
(52) U.S. Cl. ...................... 455/318; 455/317; 455/258; 455/136; 375/344
(58) Field of Search ................................. 455/318, 258, 455/255, 317, 136, 164.1, 164.2, 192.2, 256; 375/344, 343, 136, 147

(56) References Cited

U.S. PATENT DOCUMENTS

| | | | | |
|---|---|---|---|---|
| 5,495,506 A | * | 2/1996 | Shoji ........................... | 375/344 |
| 5,509,034 A | * | 4/1996 | Beukema ..................... | 375/343 |
| 5,640,431 A | * | 6/1997 | Bruckert et al. ............. | 455/136 |
| 5,696,797 A | * | 12/1997 | Bucher et al. ............... | 455/256 |
| 5,764,690 A | * | 6/1998 | Blanchard et al. .......... | 375/147 |
| 6,226,505 B1 | * | 5/2001 | Uda ............................ | 455/258 |
| 6,275,699 B1 | * | 8/2001 | Ichihara .................... | 455/164.1 |
| 6,560,270 B1 | * | 5/2003 | Hischke ....................... | 375/136 |

* cited by examiner

*Primary Examiner*—Edward F. Urban
*Assistant Examiner*—Lana Le

(57) ABSTRACT

A data-pattern feedback mechanism is introduced into the peak detection process of an automatic frequency compensation system in a Gaussian Frequency Shift Keying (GFSK) modulated system, providing fast and accurate fine-stage automatic frequency compensation (AFC). Maximum positive and negative peak registers are updated with new values as necessary based on detection during a sequence of identical binary bit values (e.g., during a "00" for detection of maximum negative peak frequency, or during a "11" for detection of maximum positive peak frequency), in a particular data frame. As soon as an initial value is determined for both the maximum positive and negative peak frequencies (e.g., after the first occurrence of a "11" and a "00", in any order), fine-stage automatic frequency compensation can be initiated. Subsequent adjustments to the VCO of the local oscillator will further refine the frequency offset towards the ideal of zero. Quick determination of the maximum positive and negative peak frequencies is made based on data pattern feedback in accordance with the principles of the present invention, allowing for a fast and accurate fine-stage automatic frequency compensation adjustment of a local oscillation clock signal.

18 Claims, 4 Drawing Sheets

STATE-MACHINE TIMING OF FINE-AFC ADJUSTMENT

FINE-STAGE AUTOMATIC FREQUENCY COMPENSATION IN POST-DETECTION SHORT-RANGE WIRELESS APPLICATIONS

BACKGROUND OF THE INVENTION

1. Field of the Invention

The present invention relates to piconet wireless networks. More particularly, it relates to frequency compensation in radio frequency (RF) devices.

2. Background of Related Art

Piconets, or small wireless networks, are being formed by more and more devices in many homes and offices. In particular, a popular piconet standard is commonly referred to as a BLUETOOTH™ piconet. Piconet technology in general, and BLUETOOTH technology in particular, provides peer-to-peer communications over short distances. The BLUETOOTH™ specification Version 1.1 is available at www.bluetooth.com, and is explicitly incorporated herein by reference.

The wireless frequency of piconets may be 2.4 GHz as per BLUETOOTH standards, and/or typically have a 20 to 100 foot range. The piconet RF transmitter may operate in common frequencies which do not necessarily require a license from the regulating government authorities, e.g., the Federal Communications Commission (FCC) in the United States. Alternatively, the wireless communication can be accomplished with infrared (IR) transmitters and receivers, but this is less preferable because of the directional and visual problems often associated with IR systems.

A plurality of piconet networks may be interconnected through a scatternet connection, in accordance with BLUETOOTH protocols. BLUETOOTH network technology may be utilized to implement a wireless piconet network connection (including scatternet). The BLUETOOTH standard for wireless piconet networks is well known, and is available from many sources, e.g., from the web site www.bluetooth.com.

According to the BLUETOOTH specification, BLUETOOTH systems typically operate in a range of 2400 to 2483.5 MHz, with multiple RF channels. For instance, in the US, 79 RF channels are defined as f=2402+k MHz, k=0, ..., 78. This corresponds to 1 MHz channel spacing, with a lower guard band (e.g., 2 MHz) and an upper guard band (e.g., 3.5 MHz).

The BLUETOOTH specification requires transmission using Gaussian Frequency Shift Keying (GFSK), with a binary one being represented by a positive frequency deviation, and a binary zero being represented by a negative frequency deviation. FIG. 4 shows the function of a conventional peak detector in determining a maximum positive peak offset frequency and a maximum negative peak offset frequency in a GFSK system. According to the BLUETOOTH piconet standard, the minimum deviation shall never be smaller than 115 KHz. Also, the transmitted initial center frequency accuracy must be +/−75 KHz from the desired center frequency.

All receiving devices have a local clock on which a baseband receive clock signal in an RF section is based. To receive a radio frequency (RF) signal from another piconet device, the receiving device must lock onto the transmitted frequency.

It is important to note that in the real world, clock signals jitter and vary somewhat within desired tolerable limits. Other than the frequency requirements, the BLUETOOTH standard specifies that the clock jitter (rms value) should not exceed 2 nS and the settling time should be within 250 uS. A significant source of clock variation is the variance between external crystal oscillators installed in any particular BLUETOOTH device. Temperature also causes variations in clock signals.

In the RF transceiver of a BLUETOOTH conforming device, the alignment of a local oscillation (LO) with a received RF signal is important to guarantee proper and correct receipt of the underlying data signal. Thus, to eliminate any frequency offset of the received RF signal with respect to the local oscillation signal, automatic frequency compensation is employed.

Automatic frequency compensation (AFC) estimates frequency offset, and appropriately adjusts the local oscillation signal, typically via a voltage controlled oscillator (VCO). In BLUETOOTH applications, because of the tight schedule of receive timing, the AFC is divided into two stages: (1) course-AFC; and (2) fine-AFC.

Course-AFC is performed during the short period when the data frame begins. During course-AFC, the receiving device roughly adjusts its local oscillation so that the frequency offset becomes smaller, e.g., allowing for the correct recognition of an appropriate access code. Thereafter, fine-AFC is performed until the completion of the data frame. During fine-AFC, the frequency offset is adjusted to a minimum value such that the frequency offset does not affect the bit error rate (BER) of the received signal.

Conventional automatic frequency compensation uses peak detection to determine the frequency offset between the local oscillation and the received RF signal, and makes a corresponding adjustment to local oscillation based thereon. However, this conventional method for detecting frequency offset is prone to errors, largely because the peak detection period is defined without the knowledge of the particular data pattern being received. Thus, frequency deviations intended to indicate a binary "1" or "0" may be misinterpreted to be a frequency offset of the center frequency.

For instance, if a long data string of 0's or a long string of 1's is received, the opposite peak can be correctly detected, causing the frequency offset to be erroneously calculated, resulting in incorrect adjustment of local oscillation. Moreover, intersymbol interference may cause the peaks to appear differently depending on the particular data patterns. Thus, if the opposite peaks are determined based on a data signal containing various interference effects, the detected offset will likely be inaccurate.

There is a need for an accurate apparatus and technique for providing fine automatic frequency compensation, particularly in time-sensitive applications and/or in the presence of intersymbol interference.

SUMMARY OF THE INVENTION

In accordance with the principles of the present invention, an offset frequency determination system comprises a peak detection module to detect a maximum positive frequency peak and a maximum negative frequency peak. A data pattern detection module detects sequential occurrences of a same binary value of data, and upon the detection directs sampling of an associated maximum positive frequency peak and an associated maximum negative frequency peak.

A method of automatically compensating an offset frequency between a received RF signal and a local oscillation source in accordance with another aspect of the present invention comprises demodulating the received RF signal into a data signal, and detecting in the data signal a sequential occurrence of a first binary state of bits and a sequential occurrence of a second binary state of bits. A maximum positive frequency peak is sampled in response to a detection of the sequential occurrence of the second binary state of bits, and a maximum negative frequency peak is sampled in response to a detection of the sequential occurrence of the first binary state of bits. A frequency offset is calculated based on the sampled maximum positive frequency peak and the sampled maximum negative frequency peak. An output frequency from the local oscillation source is adjusted based on the calculated frequency offset.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present introduces a data-pattern feedback mechanism in the peak detection process of automatic frequency compensation.

Figure 1:
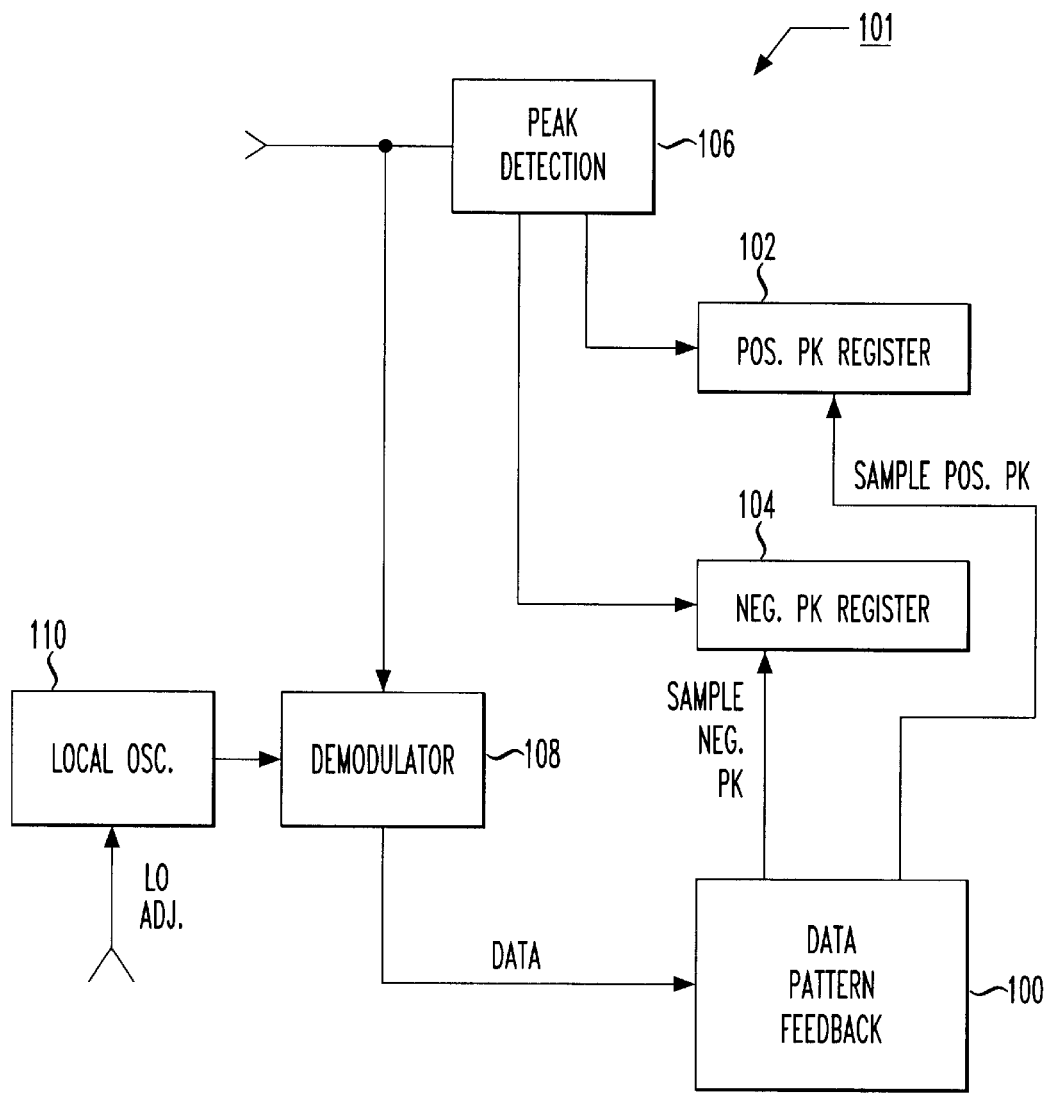
FIG. 1 shows a block diagram of an exemplary fine-stage automatic frequency compensation (AFC) system including data pattern feedback in peak detection, in accordance with the principles of the present invention.

FIG. 1 shows a block diagram of an exemplary fine-stage automatic frequency compensation (AFC) system including data pattern feedback in peak detection, in accordance with the principles of the present invention.

In particular, FIG. 1 shows an automatic frequency compensation system 101 including a peak detection module 106 and a data pattern feedback module 100. A processor may be used to comprise and/or control the various digital components shown in FIG. 1. The processor may be, e.g., a suitable digital signal processor (DSP), microprocessor, or microcontroller.

The automatic frequency compensation system 101 comprises an otherwise conventional demodulator 108, local oscillator 110, and peak detection module 106. The AFC system 101 also includes suitably sized positive peak register 102 and negative peak register 104.

The peak detection module 106 receives an RF signal from a transmitting device, and determines a maximum positive peak value of the signal's frequency, and a maximum negative peak value of the same signal. The mid-point of the difference between the maximum positive peak value and the maximum negative peak value represents the detected center frequency of the incoming RF signal, allowing adjustment of the local oscillator or reference frequency 110 to allow a match to the center frequency of the incoming RF signal.

The positive peak register 102 maintains a maximum positive peak value during a particular sampling period (e.g., during the reception of a data frame), while the negative peak register 104 maintains a maximum negative peak value during the same sampling period. Both the maximum positive peak register 102 and the maximum negative peak register 104 are reset corresponding to the beginning of each received data frame.

The demodulator 108 provides demodulation (e.g., GFSK demodulation) of an input RF into an output data stream, with an input data clock signal based on a reference clock provided by an adjustable local oscillator (e.g., a voltage controlled oscillator (VCO)), in an otherwise conventional manner as is known in the art.

Importantly, in accordance with the principles of the present invention, a data pattern feedback module 100 monitors the received data stream (e.g., output from the demodulator 108) and searches for binary data associated either with a normal positive deviation from the center frequency (e.g., a '1') or with a normal negative deviation from the center frequency (e.g., a '0').

The present invention searches for a sequential occurrence of a particular data pattern (e.g., a "00" or a "11") wherein the received signal will be either negatively or positively biased from the center frequency, respectively. Using conventional peak detection methods and apparatus, sequential strings of similar binary data will cause errors in the calculated frequency offset between the actual center frequency of the received RF signal and the frequency based on the local oscillator 110. Using data pattern feedback in accordance with the principles of the present invention, the positive or negative bias of the peak detection due to strings of similar binary data will be compensated more accurately.

During the fine-AFC stage, the frequency offset is assumed to be not too large, e.g., less than 75 KHz (for BLUETOOTH apps). In the disclosed embodiment, the processor initially quickly estimates the offset to a low non-harmful value (e.g., to less than 5 KHz) sampled only during the reception of corresponding binary data, then serves as a feedback loop to keep the offset low in case of frequency drift that might occur during receipt of the data frame.

Frequency offset is measured as the mid-point between the maximum positive & negative peaks detected by the peak detection module 106. After the frequency offset has been measured, the automatic frequency compensation (AFC) system 100 adjusts the VCO in the local oscillator 110 accordingly. Preferably, the VCO is allowed to settle for a given amount of time appropriate to the particular frequencies used. Then, the frequency offset is measured in the fine-stage AFC, and frequency adjustments to the VCO in the local oscillator 110 continue until the data frame or burst ends.

Note that VCO settling does not necessarily mean phase locked loop (PLL) settling, which takes much longer. Thus, a partial settling is desired after the VCO in the local oscillator 110 has been adjusted by the AFC scheme. Otherwise, the automatic frequency compensation must wait for too long before the next iteration begins.

The length of peak detection performed by the peak detection module 106 is not fixed in time, but rather is dependant on the length of the data frame. The automatic frequency compensation system 101 uses fully extended maximum positive and negative frequency peaks to estimate the frequency offset between the received RF signal and the local oscillator 110. In the disclosed embodiment, as soon as both maximum frequency peaks have been detected by the peak detection module 106, they are stored in the maximum positive peak register 102 and the maximum negative peak register 104. Based on these maximum peak register values 102, 104, as soon as they are detected, the frequency offset between the local oscillator or reference clock 110 and the received RF signal is estimated, and the VCO of the local oscillator 110 is adjusted accordingly. Thus, continual updating of the VCO frequency may occur and is likely during the reception of any particular data frame or burst, particularly in the case of longer data streams.

The maximum positive peak register 102 and maximum negative peak register 104 are updated with new values as necessary during the reception of a particular data frame. However, as soon as an initial value is determined for both the maximum positive and negative peak frequencies (e.g., after the first occurrence of a "11" and a "00", in any order), fine-stage automatic frequency compensation can be initiated. Subsequent adjustments to the VCO of the local oscillator 110 will further refine the frequency offset towards the ideal of zero. However, quick determination of the maximum positive and negative peak frequencies based on data pattern feedback in accordance with the principles of the present invention allows for a fast and accurate fine-stage frequency adjustment.

Figure 2:
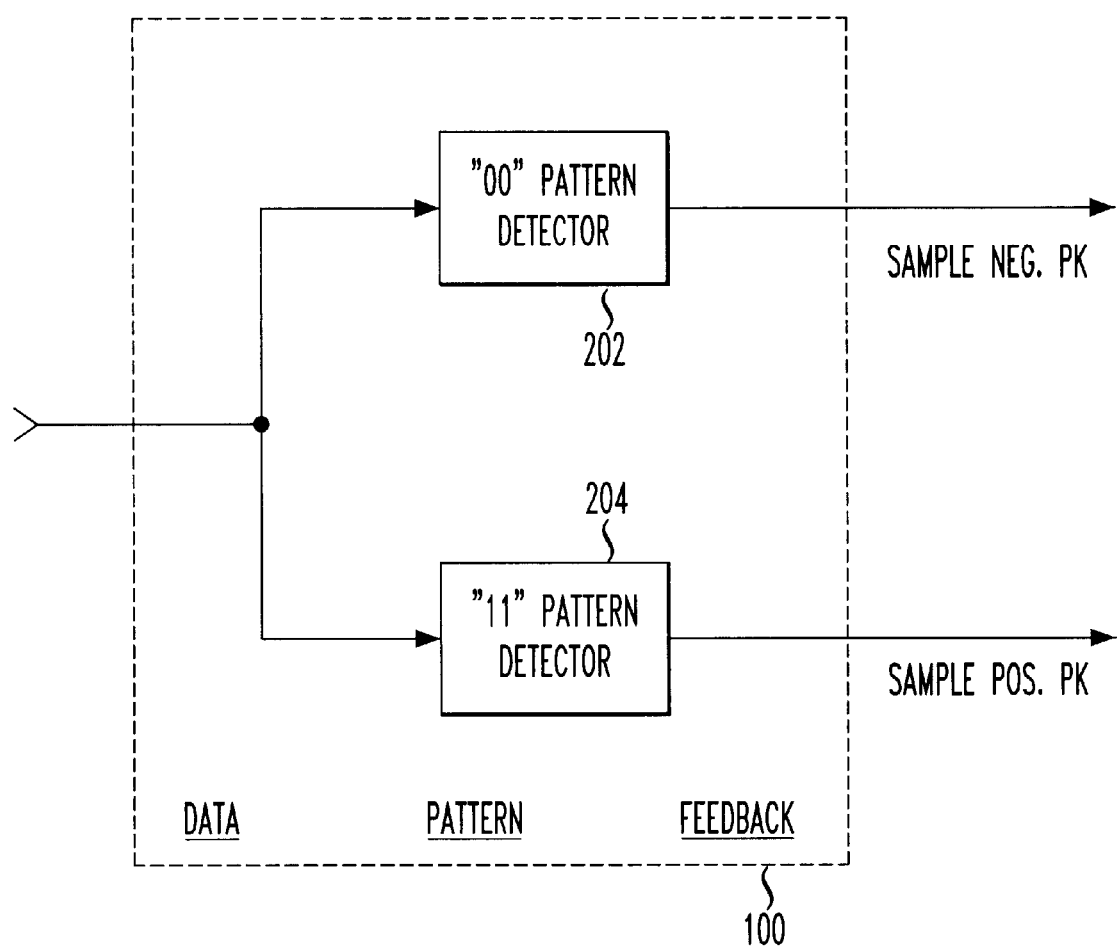
FIG. 2 shows a block diagram of an exemplary data pattern feedback module shown in FIG. 1.

FIG. 2 shows a block diagram of an exemplary data pattern feedback module shown in FIG. 1.

In particular, as shown in FIG. 2, the data pattern feedback module 100 includes a "00" pattern detector 202 and a "11" pattern detector 204. While the present invention relates to the detection of a sequential pattern of two identical binary bits, larger length patterns may be utilized (e.g., "000" and "111"; "0000" and "1111", etc.) Moreover, while it is preferred that the same number of bits be in each binary search pattern, it is possible to utilize peak frequency values obtained with differing length search patterns (e.g., "00" and "1111"), in accordance with the principles of the present invention.

The amount of time that the automatic frequency compensation system 100 takes to measure the offset and the time to wait VCO settle should be ratioed appropriate to the particular application. For instance, in the given BLUETOOTH piconet application, the peak detection period is fixed at, e.g., 8 uS. During the 8 uS time slot, both the maximum positive and negative frequency peaks are recorded. Then, at the end of the peak detection period (e.g, at the end of the 8 uS time period), the maximum positive and negative frequency peaks are averaged, with the result indicating the current frequency offset, based on which the frequency output from the VCO in the local oscillator 110 is adjusted.

Figure 3:
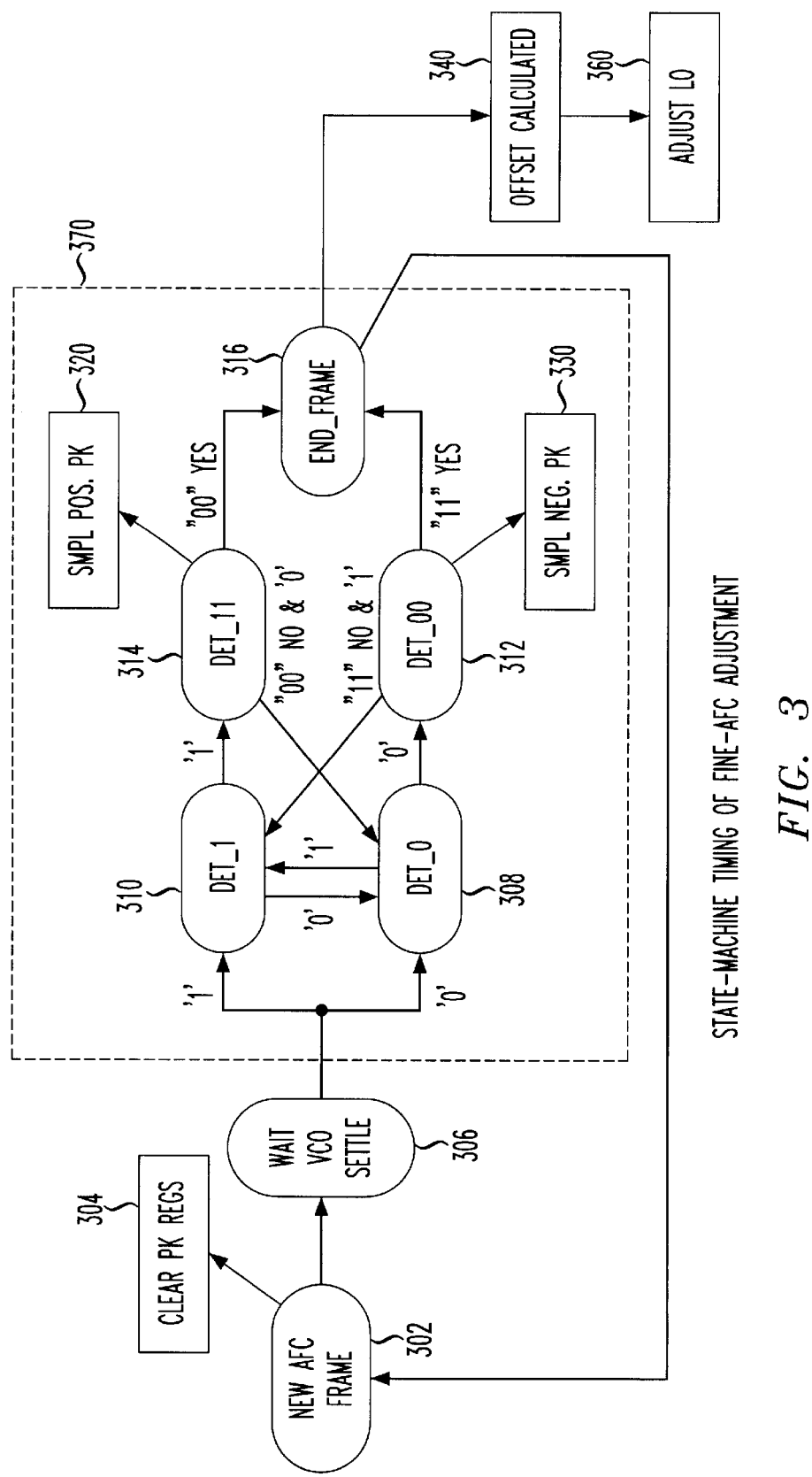
FIG. 3 shows an exemplary state machine timing of fine-stage automatic frequency compensation, in accordance with the principles of the present invention.
Figure 4:
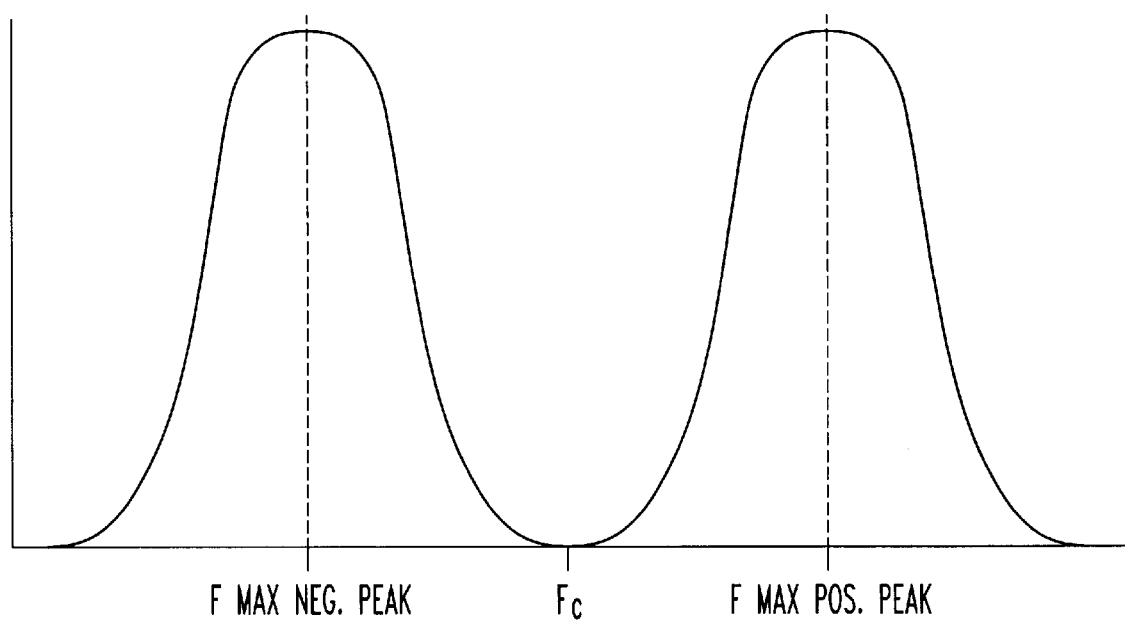
FIG. 4 shows the function of a conventional peak detector in determining a maximum positive peak offset frequency and a maximum negative peak offset frequency.

FIG. 3 shows an exemplary state machine timing showing the overall process of interactive, fine-stage automatic frequency compensation adjustment, in accordance with the principles of the present invention. Curved blocks depict states, and rectangular blocks depict actions. Thick lines show a transition between states, whereas thinner lines depict accompanying operations from the state.

In particular, as shown in FIG. 3, a new data frame is input to the automatic frequency compensation system 101 as shown in state 302, and any previous peak detection results are cleared, e.g., by resetting appropriate registers, as shown in action 304.

In state 306, the automatic frequency compensation system 101 waits an appropriate amount of fixed time for the output of the VCO to settle.

Data pattern detection and feedback is performed as depicted generally in function 370. In action 340, the frequency offset is calculated, and the appropriate adjustments are made to the VCO in the local oscillator 110, as depicted in action 360.

Function 370 provides the important data pattern detection and feedback, in accordance with the principles of the present invention. In particular, after the VCO has settled in step 306, the next data bit (or symbol) is determined to fit one of two patterns. For example, in the case of bit detection, either the "detect '1'" state 310 or the "detect '0'" state will be entered. In the exemplary case of bit-wise determination, the sign of the data bit can be checked, e.g., with a comparator. Thus, if a binary "1" is detected, state "detect '1'" 310 will be entered. Otherwise, the state "detect '0'" 308 will be entered.

In "det_1" state 310, if a binary "0" is detected, "det_0" state 308 is entered. Otherwise, state "det_11" 314 is entered. Thereafter, the output of the demodulator 108 (FIG. 1) is sampled and held, or otherwise stored as the current maximum positive peak, as depicted in action 320.

In "det_0" state 308, if a binary "1" is detected, "det_1" state 310 is entered. Otherwise, state "det_00" 312 is entered. Thereafter, the output of the demodulator 108 sampled and held, or otherwise stored as the current maximum negative peak, as depicted in action 330.

In "det_11" state 314, if a binary "0" is detected and the "det_00" state 312 has not been reached in this portion of the AFC frame, then the "det_0" state 308 is entered. Otherwise, the state machine proceeds to an "end_frame" state 316.

In "det_00" state 312, if a binary "1" is detected and the "det_11" state 314 has not been reached in this portion of the AFC frame, then the "det_1" state 310 is entered. Otherwise, the state machine proceeds to the "end_frame" state 316.

In the "end_frame" state 316, the frequency offset is calculated with the detected maximum positive and negative frequency peaks by averaging therebetween, and the VCO of the local oscillator 110 is then adjusted accordingly and fine-stage automatic frequency compensation of the current data frame is complete in a quick and accurate manner.

To iteratively adjust the frequency output from the VCO of the local oscillator 110, the state machine returns to state 302 for reception of a new data frame.

By providing data pattern feedback in a peak detection process for reception of a modulated data (e.g., a GFSK modulated signal), the time required to achieve fine-stage automatic frequency compensation is reduced. Moreover, the data feedback guarantees that both the maximum positive frequency peak and the maximum negative frequency peak are fully extended, thereby minimizing the effects of intersymbol interference on the calculation of frequency offset for adjustment of a local oscillation source.

While the present invention has particular applicability to piconet network devices in general, and BLUETOOTH integrated circuits and devices in particular, fine-stage automatic frequency compensation in accordance with the principles of the present invention have applicability in many other types of RF integrated circuits and devices.

While the invention has been described with reference to the exemplary preferred embodiments thereof, those skilled in the art will be able to make various modifications to the described embodiments of the invention without departing from the true spirit and scope of the invention.

What is claimed is:

1. An offset frequency determination system, comprising:
 a peak detection module to detect a maximum positive frequency peak and a maximum negative frequency peak;

a data pattern detection module to detect sequential occurrences of a same binary value of data, and upon said detection to direct sampling of an associated maximum positive frequency peak and an associated maximum negative frequency peak.

2. The offset frequency determination system according to claim 1, wherein:
said maximum positive frequency peak is associated with a sequential occurrence of binary "1" data.

3. The offset frequency determination system according to claim 2, wherein:
said sequential occurrence of binary "1" data is a pattern "11".

4. The offset frequency determination system according to claim 1, wherein:
said maximum negative frequency peak is associated with a sequential occurrence of binary "0" data.

5. The offset frequency determination system according to claim 4, wherein:
said sequential occurrence of binary "0" data is a pattern "00".

6. The offset frequency determination system according to claim 1, further comprising:
a local oscillator including a voltage controlled oscillator adjusted based on an offset frequency determined by said offset frequency determination system.

7. The offset frequency determination system according to claim 6, further comprising:
a demodulator to demodulate a received RF signal in accordance with a receive data clock based on an output of said local oscillator.

8. The offset frequency determination system according to claim 7, wherein:
said demodulator is a Gaussian Frequency Shift Keying demodulator.

9. The offset frequency determination system according to claim 1, wherein:
said offset frequency determination system is installed in a piconet network device.

10. The offset frequency determination system according to claim 9, wherein:
said piconet network device is a BLUETOOTH conforming device.

11. A method of automatically compensating an offset frequency between a received RF signal and a local oscillation source, comprising:
demodulating said received RF signal into a data signal;
detecting in said data signal a sequential occurrence of a first binary state of bits and a sequential occurrence of a second binary state of bits;
sampling a maximum positive frequency peak in response to a detection of said sequential occurrence of said second binary state of bits;
sampling a maximum negative frequency peak in response to said detection of said sequential occurrence of said first binary state of bits;

calculating a frequency offset based on said sampled maximum positive frequency peak and said sampled maximum negative frequency peak; and
adjusting an output frequency from said local oscillation source based on said calculated frequency offset.

12. The method of automatically compensating an offset frequency between a received RF signal and a local oscillation source according to claim 11, wherein:
said first binary state is "1"; and
said second binary state is "0".

13. The method of automatically compensating an offset frequency between a received RF signal and a local oscillation source according to claim 11, wherein:
said received RF signal is Gaussian Frequency Shift Keying (GFSK) modulated.

14. The method of automatically compensating an offset frequency between a received RF signal and a local oscillation source according to claim 11, wherein:
said local oscillation source includes a voltage controlled oscillator.

15. Apparatus for automatically compensating an offset frequency between a received RF signal and a local oscillation source, comprising:
means for demodulating said received RF signal into a data signal;
means for detecting in said data signal a sequential occurrence of a first binary state of bits in said data signal and a sequential occurrence of a second binary state of bits in said data signal;
means for sampling a maximum positive frequency peak in response to a detection of said sequential occurrence of said second binary state of bits;
means for sampling a maximum negative frequency peak in response to a detection of said sequential occurrence of said first binary state of bits;
means for calculating a frequency offset based on said sampled maximum positive frequency peak and said sampled maximum negative frequency peak; and
means for adjusting an output frequency from said local oscillation source based on said calculated frequency offset.

16. Apparatus for automatically compensating an offset frequency between a received RF signal and a local oscillation source according to claim 15, wherein:
said first binary state is "1"; and
said second binary state is "0".

17. Apparatus for automatically compensating an offset frequency between a received RF signal and a local oscillation source according to claim 15, wherein:
said received RF signal is Gaussian Frequency Shift Keying (GFSK) modulated.

18. Apparatus for automatically compensating an offset frequency between a received RF signal and a local oscillation source according to claim 15, wherein:
said local oscillation source includes a voltage controlled oscillator.

* * * * *